(12) United States Patent
Ebert

(10) Patent No.: US 7,066,690 B2
(45) Date of Patent: Jun. 27, 2006

(54) APPARATUS FOR REPAIRING VEHICLE AXLES

(75) Inventor: James L. Ebert, Freemont, OH (US)

(73) Assignee: Precision Machining Corp., Huron, OH (US)

( * ) Notice: Subject to any disclaimer, the term of this patent is extended or adjusted under 35 U.S.C. 154(b) by 316 days.

(21) Appl. No.: 10/624,184

(22) Filed: Jul. 22, 2003

(65) Prior Publication Data

US 2005/0019117 A1    Jan. 27, 2005

(51) Int. Cl.
*B23B 41/00* (2006.01)
(52) U.S. Cl. .......................... 408/88; 408/95; 408/102; 408/103; 408/138; 408/141
(58) Field of Classification Search ............. 408/72 R, 408/87, 88, 95, 97–98, 102–103, 138, 141; 29/402.06, 26 B; B23B 41/00
See application file for complete search history.

(56) References Cited

U.S. PATENT DOCUMENTS

| | | | | |
|---|---|---|---|---|
| 1,470,635 A | * | 10/1923 | Muehlberg | 408/95 |
| 2,004,228 A | * | 6/1935 | Storm et al. | 408/95 |
| 2,416,402 A | * | 2/1947 | Mitchell | 408/54 |
| 3,131,583 A | * | 5/1964 | Hanley et al. | 408/97 |
| 4,098,029 A | | 7/1978 | Shiets | |
| 4,358,229 A | * | 11/1982 | Rukes | 408/88 |
| 4,414,869 A | * | 11/1983 | Augustine | 82/128 |
| 4,455,732 A | | 6/1984 | Shiets | |
| 4,571,795 A | | 2/1986 | Shiets | |
| 4,580,931 A | * | 4/1986 | Wilger et al. | 408/72 R |
| 4,820,089 A | | 4/1989 | Shiets | |
| 4,969,246 A | | 11/1990 | Shiets | |
| 4,990,037 A | * | 2/1991 | Strait | 408/72 R |
| 5,125,146 A | | 6/1992 | Ferrari | |
| 5,966,812 A | | 10/1999 | Shiets | |
| 6,024,418 A | | 2/2000 | Ebert | |

* cited by examiner

*Primary Examiner*—Daniel W. Howell
*Assistant Examiner*—J Williams
(74) *Attorney, Agent, or Firm*—Brinks Hofer Gilson & Lione

(57) ABSTRACT

A boring apparatus and method for in-situ repair of motor vehicle axles includes a universal mounting plate assembly for attachment to a vehicle axle, both longitudinal (on-axis) and transverse (radial) adjustment assemblies, a bearing assembly and a boring bar and drive assembly having a pair of motor drive units for rotating (speed) and axially advancing (feed) the boring bar. The longitudinal and transverse adjustment assemblies facilitate use of the boring apparatus on a wide variety of vehicle and truck axles from virtually all manufacturers to repair broken axles or damaged bearing surfaces.

20 Claims, 8 Drawing Sheets

APPARATUS FOR REPAIRING VEHICLE AXLES

BACKGROUND OF THE INVENTION

The invention relates generally to an apparatus and method for repairing vehicle axles and more specifically to an apparatus and method for in-situ repair of broken and damaged axles on motor vehicles, particularly trucks, trailers, and construction equipment.

The failure of motor vehicle axle and bearing components in large trucks, tractors, and motor vehicles is a not uncommon event. Notwithstanding preventive maintenance, such failures typically occur while the vehicle is in service and thus away from repair facilities. Not only may the replacement of an axle consume several days, but generally the vehicle must also be towed to a service facility to undertake same. Due to the expense, both of the actual repair and the lost income accompanying the down time of the vehicle, an industry directed to on-site repair of such failed vehicle axle components has developed.

One of the earlier patents in this area is U.S. Pat. No. 4,098,029 entitled Axle Grinder which issued to Leo C. Sheits on Jul. 4, 1978. This device resurfaced the bearing surface of a vehicle axle after it had been built up by the addition of weld material thereabout.

Another patent of Leo C. Sheits issued Jun. 26, 1984 as U.S. Pat. No. 4,455,732. Here, a fixture is utilized to secure a boring machine to the vehicle axle to enlarge and restore the interior terminal portion of the axle.

Another boring device of Leo C. Shiets is disclosed in U.S. Pat. No. 4,820,089. Here, a clamp-on fixture and boring machine facilitates the restoration of front axle steering components.

Since these early devices, the demand for improved repair quality has risen steadily, accompanied by a realization that additional features and flexibility would both enhance the functionality of such devices and improve the overall quality of the repair. Improved repair quality, in turn, results in greatly enhanced service life of the repair whereas increased functionality of such machines renders them useable in an even broader range of trailer configurations and manufacturers' products.

The following disclosure is directed to an apparatus and method for in-situ repair of vehicle axles which exhibit such improved flexibility and repair quality.

BRIEF SUMMARY OF THE INVENTION

A boring apparatus and method for in-situ repair of motor vehicle axles includes a universal mounting plate assembly for attachment to a vehicle axle, a mounting or attachment assembly, longitudinal (on-axis) and transverse (radial) adjustment assemblies, a bearing assembly and a boring bar and drive assembly having a pair of motor drive units for rotating (speed) and axially advancing (feed) the boring bar. Both the attachment assembly and the longitudinal and transverse adjustment assemblies facilitate use of the boring apparatus on a wide variety of vehicle and truck axles from virtually all manufacturers to repair broken axles or damaged bearing surfaces.

Thus it is an object of the present invention to provide an apparatus for in-situ repair of motor vehicle axles.

It is a further object of the present invention to provide a method of repairing motor vehicle axles.

It is a still further object of the present invention to provide a boring apparatus having an attachment assembly which is adjustable and secures the apparatus to virtually any vehicle axle.

It is a still further object of the present invention to provide a boring apparatus for the in-situ repair of motor vehicle axles having both longitudinal and transverse adjustment assemblies.

It is a still further object of the present invention to provide a boring apparatus for in-situ repair of motor vehicle axles having a pair of drive assemblies for rotating and advancing the boring tool.

Further objects and advantages of the present invention will become apparent by reference to the following description of the preferred embodiment and appended drawings wherein like reference numbers refer to the same component, element, or feature.

DETAILED DESCRIPTION OF THE INVENTION

Figure 1:
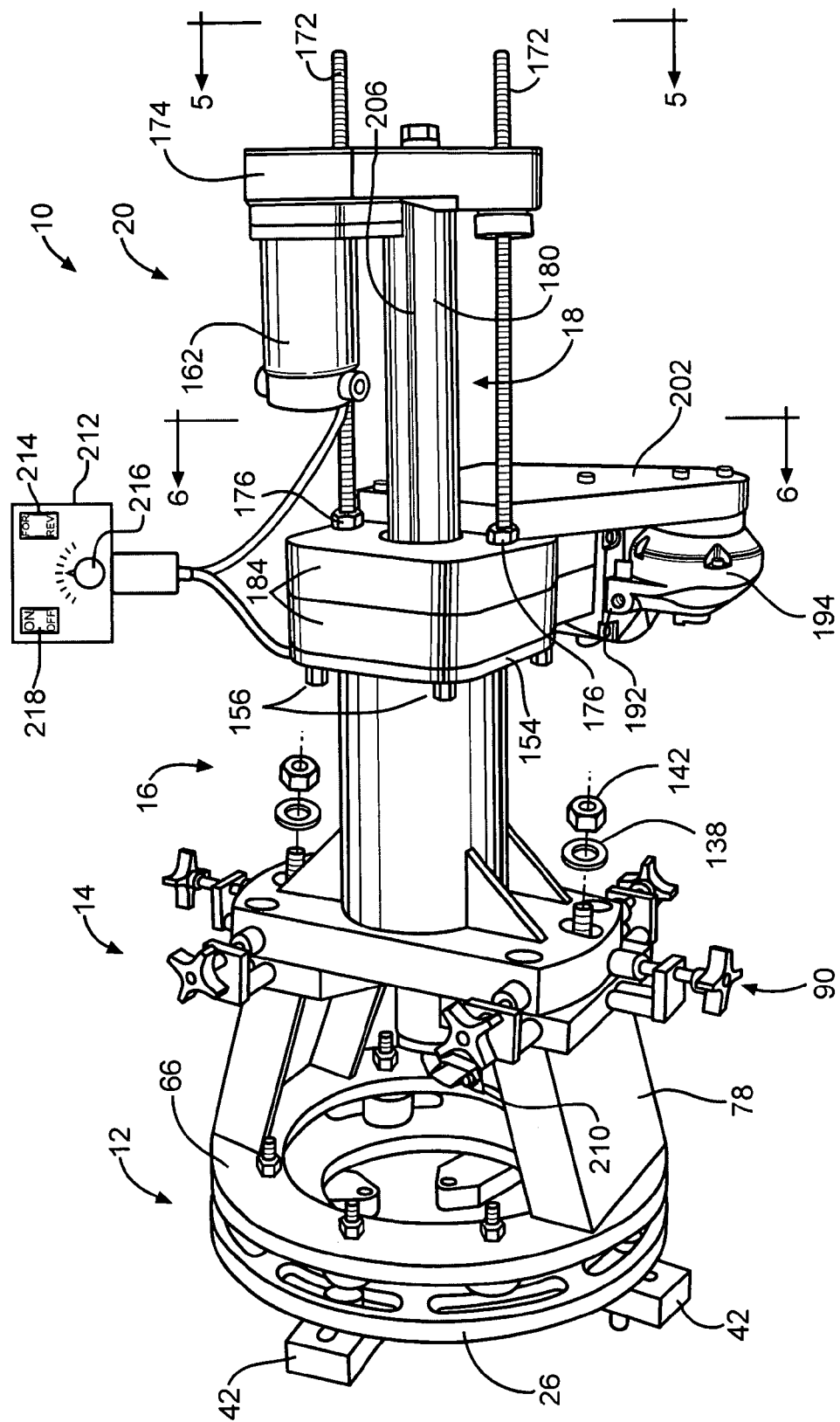
FIG. 1 is a perspective view of an assembled apparatus for in-situ repair of motor vehicle axles according to the present invention.
Figure 7:
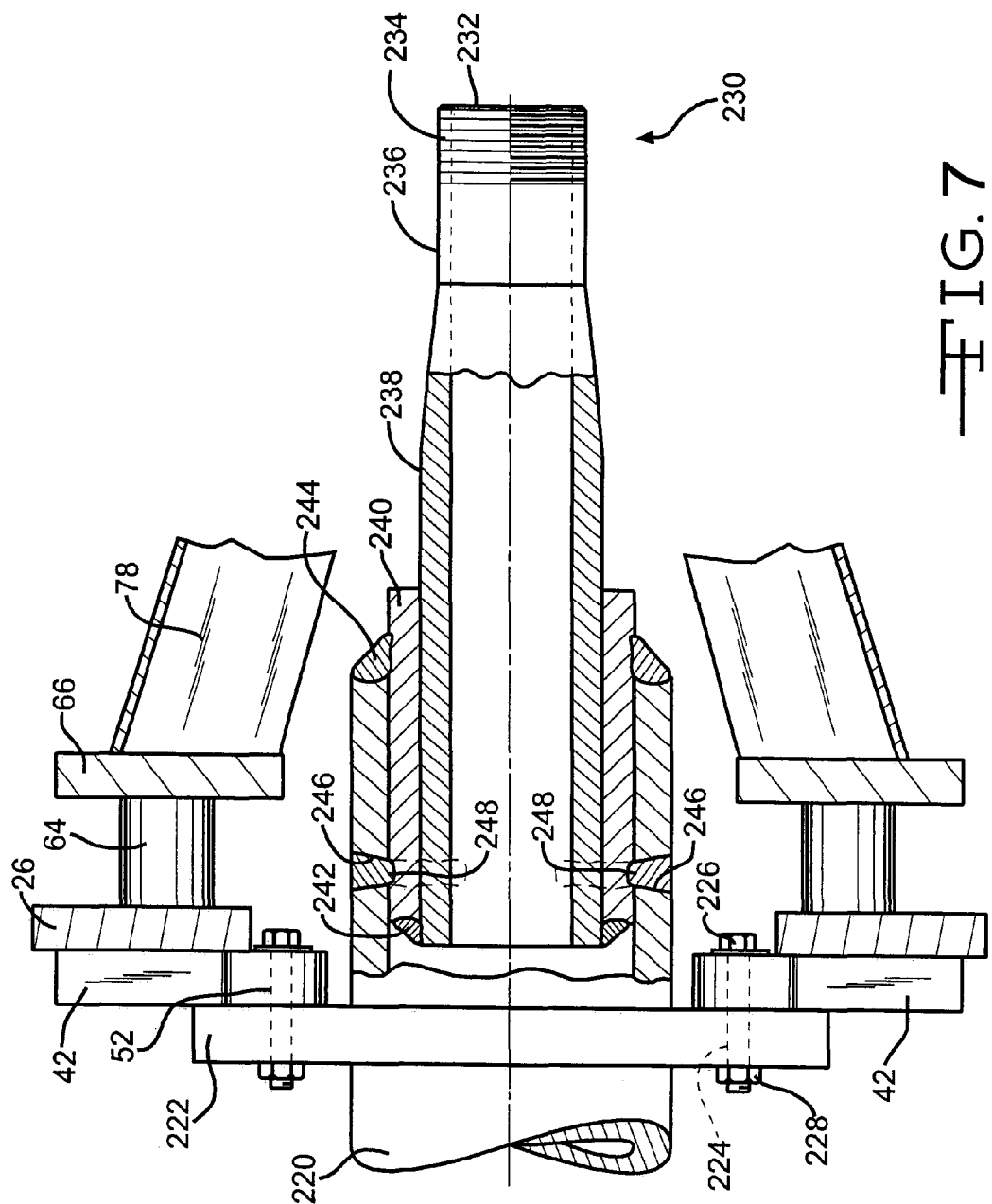
FIG. 7 is a diagrammatic view of a first method of axle repair according to the present invention.

Referring now to FIG. 1, a boring apparatus for in-situ repair of motor vehicle axles is illustrated and generally designated by the reference number 10. The boring apparatus 10 includes an attachment and adapter assembly 12 which secures the apparatus 10 to the brake flange of a motor vehicle axle, as illustrated in FIG. 7 and as will be described subsequently, and provides longitudinal adjustment, as will also be described subsequently. Attached to the adapter assembly 12 is a radial adjustment assembly 14 which provides orthogonal adjustment, i.e. adjustment along axes normal to one another and disposed in a plane normal to the axis of rotation of the boring tool. A bearing assembly 16 is secured to the adjustment assembly 14 and provides secure rotational support to an elongate boring bar assembly 18. Finally, the apparatus 10 includes a boring bar drive assembly 20 which rotates and advances or retracts the boring bar assembly 18.

Figure 2:
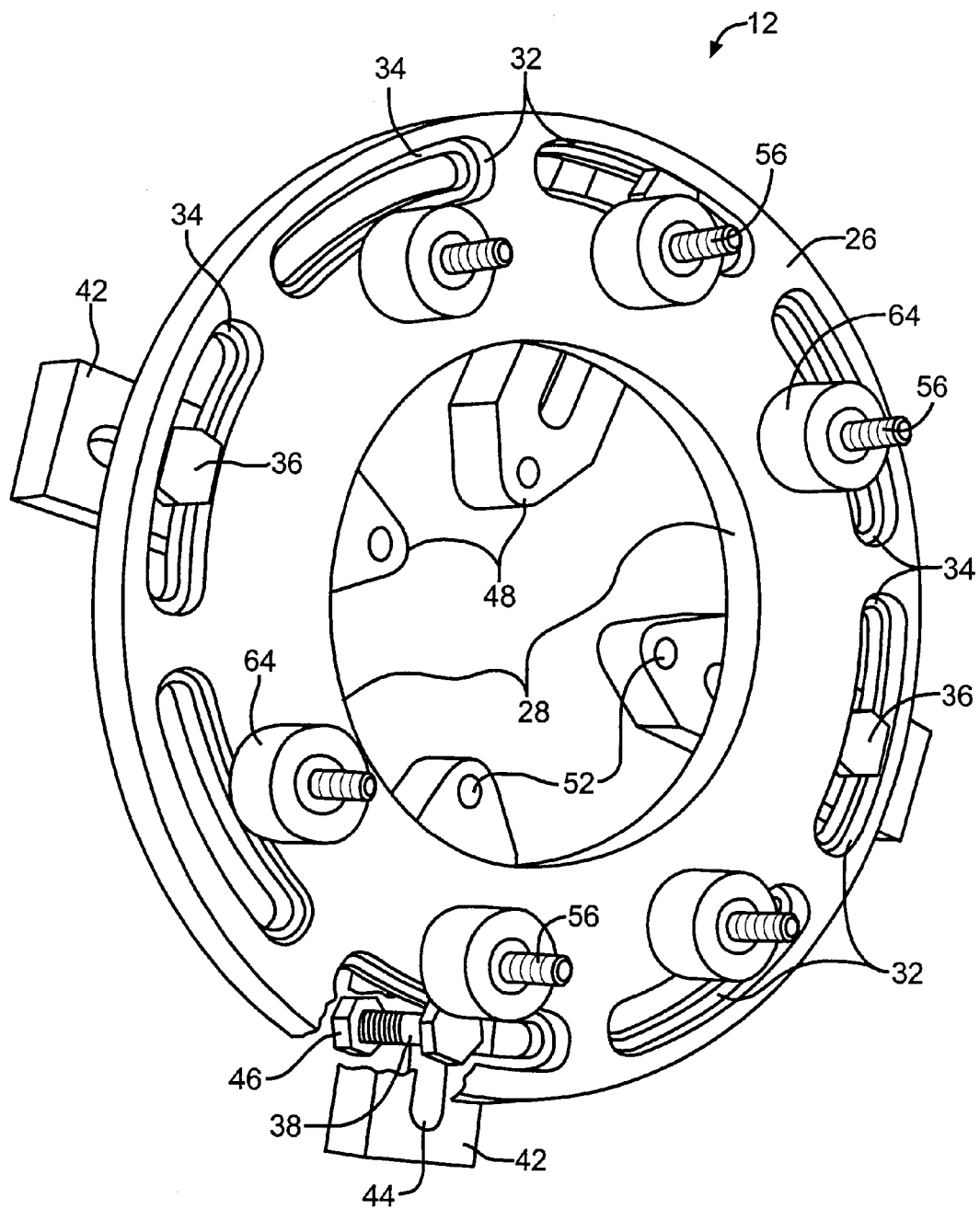
FIG. 2 is a perspective view of a longitudinal adjustment assembly on a boring apparatus according to the present invention.

Referring now to FIG. 2, the attachment and adapter assembly 12 is illustrated and includes a first annular plate 26 defining a large center aperture or opening 28 and a plurality of curved, stepped slots 32. The curved slots 32 preferably define circumferential slots 32 having a constant radius from the center of the first annular plate 26. The slots 32 include a centrally, axially disposed web or lip 34 which defines a shoulder on both sides and which cooperate with the heads 36 of appropriately sized machine bolts 38 to assist their retention within the slots 32. The bolt heads 36 are sized to be non-rotatably received within the slots 34. The machine bolts 38 extend through and adjustably retain four generally radially disposed mounting bars, lugs or ears 42. The mounting lugs or ears 42 include elongate slots 44 through which the machine bolts 38 extend and which facilitate radial as well as circumferential adjustment of the lugs or ears 42 relative to the first annular plate 26. Conventional nuts 46 may be tightened upon the machine bolts 38 to attach and securely retain the lugs or ears 42 to the first annular plate 26 in a desired position or loosened to facilitate adjustment thereof.

Preferably, the lugs or ears 42 include tapered, radially inwardly directed noses 48 which include through openings 52. The through openings 52 receive threaded fasteners such as bolts and nuts which secure the lugs or ears 42 and correspondingly the first annular plate 26 to a brake flange of a motor vehicle axle, as illustrated in FIG. 7. While the assembly 12 has been illustrated with four lugs or ears 42, it will be appreciated, as evidenced by the eight circumferential slots 32 illustrated in the annular plate shown in FIG. 2, that the lugs or ears 42 may be arranged and attached differently than illustrated in FIG. 3, or that more or fewer lugs or ears 42 may be utilized with a given first annular plate 26 for a particular repair procedure.

Extending away from the face of the first annular plate 26 opposite to the face upon which the lugs or ears 42 reside are a plurality of radially extending bolts 56. The bolts are non-rotatable by virtue of having, for example, square or hexagonal heads 58 which are received within complementarily configured openings or a continuous slot 62. It will be appreciated that the bolts 56 may be removed from the first annular plate 26 and replaced by longer or shorter bolts 56 as necessary. Axially disposed about each of the bolts 56 is a spacer 64. For a given repair project, a set of six tubular spacers 64 having identical axial lengths will be utilized with suitable length elongate bolts 56 to properly axially position the adjustment mechanism 14 and other components of the apparatus 10 at an appropriate, minimum distance from the brake flange in order to ensure optimum operation and the best possible repair. It is acknowledged that a situation may exist where the tubular spacers 64 are not utilized and the elongate bolts 56 are utilized to attach the adjustment mechanism 14 directly to the face of the first annular plate 26 opposite the lugs or ears 42. Furthermore, it should be understood that analogous structures such as square or polygonal spacers, a single annular spacer of a desired thickness, multiple annular spacers stacked together to provide a desired thickness or partial, e.g., semi-circular spacers, all having appropriate openings for receiving the elongate bolts 56 may be substituted for the tubular spacers 64.

Figure 3:
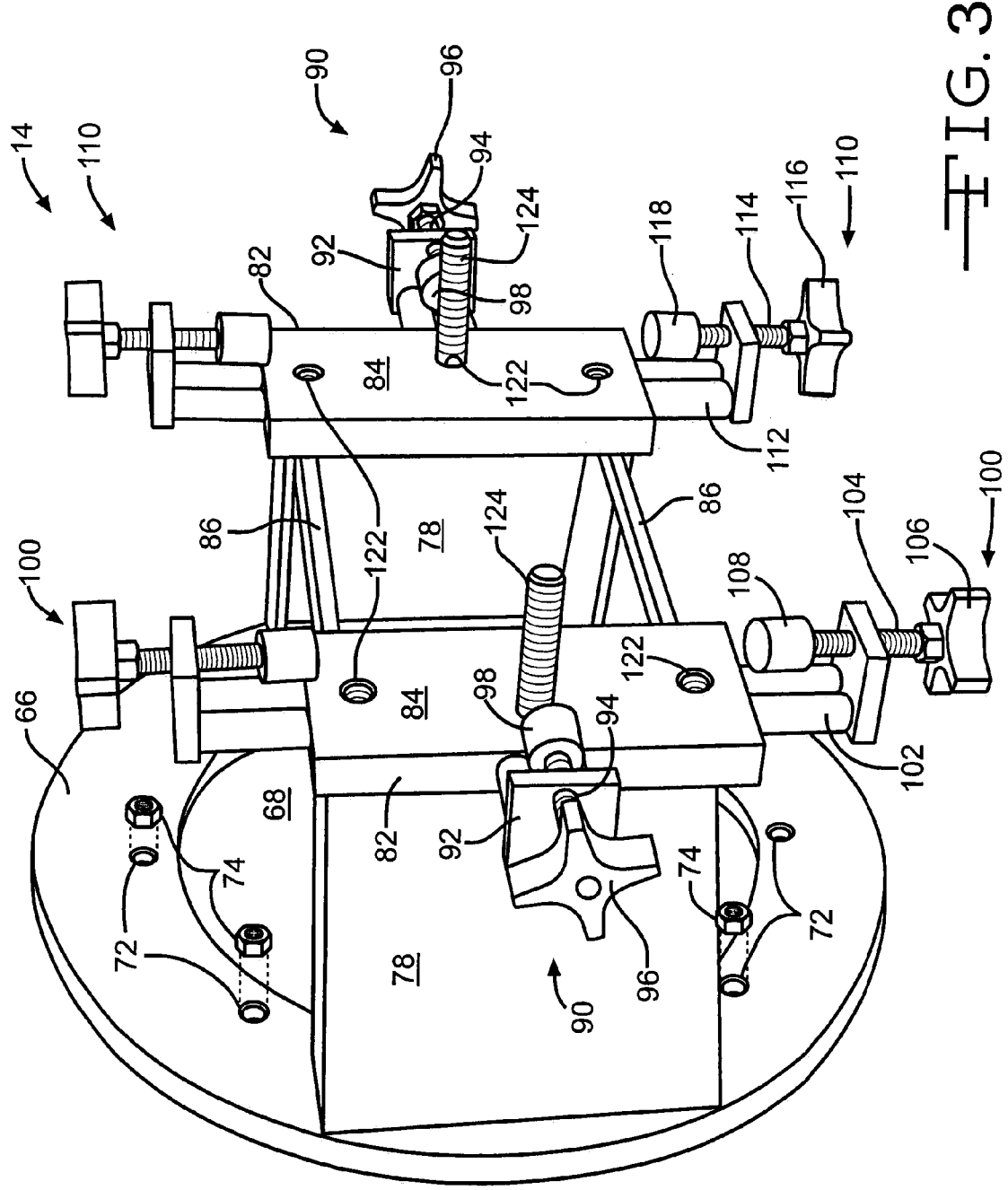
FIG. 3 is a perspective view of a transverse adjustment assembly of a boring apparatus according to the present invention.

Referring now to FIG. 3, the radial adjustment assembly 14 is illustrated and includes a second annular plate 66 having an outside diameter preferably, though not necessarily, equal to the diameter of the first annular plate 26 of the attachment and adapter assembly 12. The second annular plate 66 includes a large center aperture 68 and defines a plurality, preferably six, through apertures 72 which are arranged and aligned to receive a respective one of the elongate fasteners 56 extending from the first annular plate 26. An appropriate plurality of threaded fasteners such as conventional nuts 74 may be utilized to selectively secure the assemblies 12 and 14 together. A pair of struts or brackets 78 which may be secured to the second annular plate 66 by welding terminate in a pair of spaced apart rectangular flat plates 82. The pair of rectangular flat plates 82 define a respective pair of co-planar surfaces 84 which are parallel to the rear face of the second annular plate 66. Additional brackets or braces 86 extending between the struts or brackets 78 and the rectangular plates 82 may be utilized to ensure the rigidity of the assembly 14.

Arranged in pairs adjacent and secured to the pair of rectangular flat plates 82 are pairs of adjustment assemblies. A first pair of adjustment assemblies 90 each includes a right angle mounting bracket 92 and a threaded adjustment screw 94 having a thumbwheel 96 at one end and a bumper 98 at the opposite end. One of the first pair of adjustment assemblies 90 is secured to one of the pair of rectangular flat plates 82 and the other one of the first pair of adjustment assemblies 90 is second to the other rectangular flat plate 82. In accordance with conventional practice, clockwise rotational of the thumbwheel 96 advances the threaded shaft 94 and the bumper 98 and vice versa. It will be appreciated that the two threaded shafts 94 of the first adjustment assembly 90 may and are axially aligned and generally intended to work in opposition along a first axis, that is, as one thumbwheel 96, shaft 94, and bumper 98 are advanced, the opposite thumbwheel 96, shaft 94, and bumper 98 may be retracted, to translate the bearing assembly 16 along a first axis defined by the axis of the two aligned threaded shafts 94.

A second pair of adjustment assemblies 100 is secured to one of the rectangular plates 82 and is oriented along an axis normal to the axis extending between the first pair of adjustment assemblies 90. The second pair of adjustment assemblies 100 each include a right angle mounting bracket 102 which receives a threaded shaft 104 having a thumbwheel 106 on one end and a bumper 108 on the opposite end. The second pair of adjustment assemblies 100 may, as noted above, be operated in opposition and are generally used to make adjustments generally along a second axis normal to the first axis extending between the first adjustment mechanisms.

On the other rectangular plate 82 is a third pair of adjustment assemblies 110. Like the other pairs of adjustment assemblies 90 and 100, each of the third pair of adjustment assemblies 110 includes a right angle mounting bracket 112, a threaded shaft 114, a thumbwheel 116 and a bumper 118. The third pair of adjustment assemblies 110 operates along an axis parallel to the second pair of adjustment assemblies 100 and normal to the axis of the first pair of adjustment assemblies 90.

The rectangular plates 82 also include a plurality of threaded apertures 122. Preferably threaded into the threaded apertures 122 generally near the respective centers of the rectangular plates 82 are a respective pair of threaded studs 124. Alternatively, the openings 122 may be unthreaded and conventional machine bolts may extend therethrough. The threaded studs 124 are utilized to attach the bearing assembly 16 as illustrated in FIG. 1.

Figure 4:
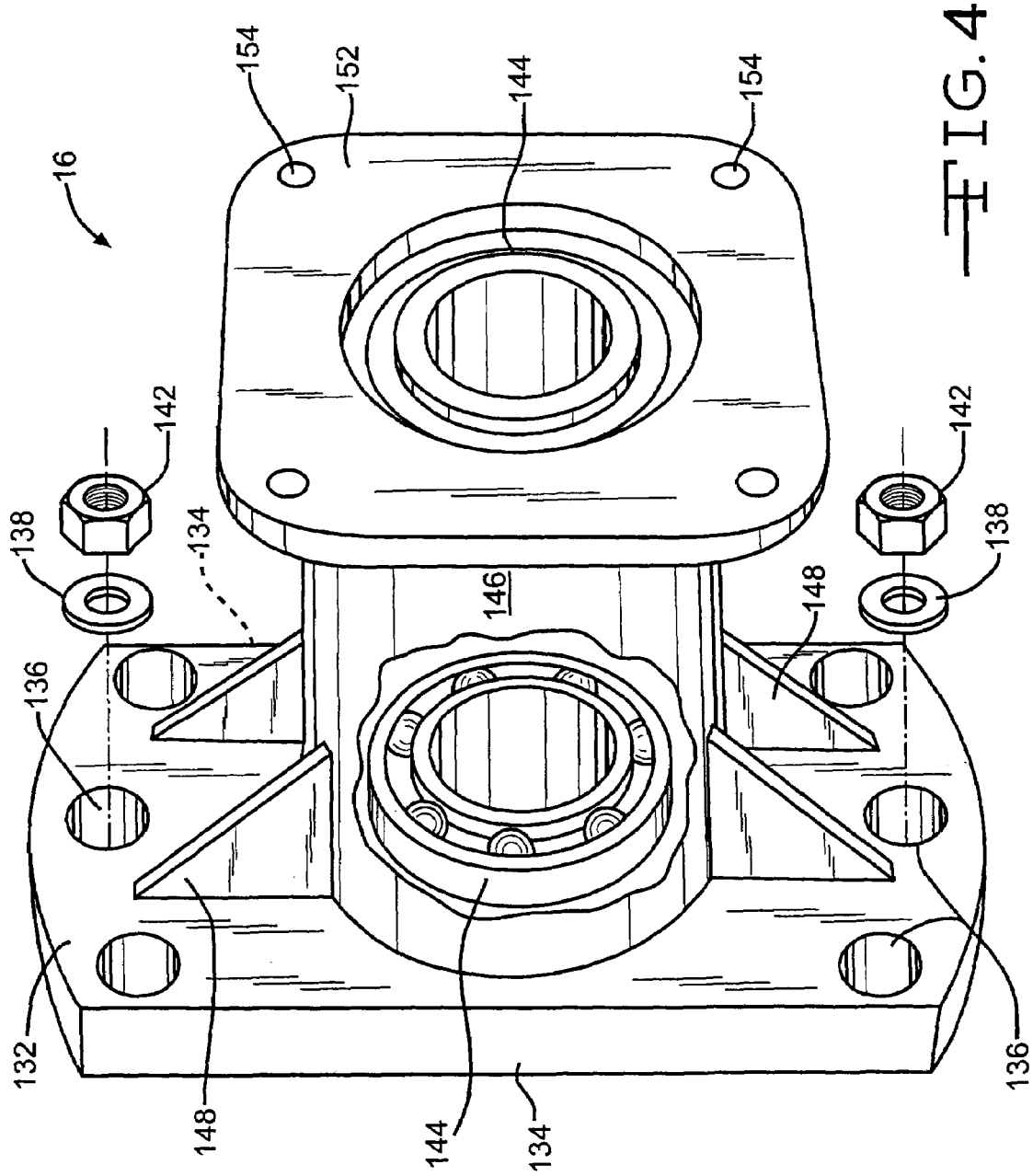
FIG. 4 is a perspective view of a bearing assembly of a boring apparatus according to the present invention.

Referring now to FIGS. 1 and 4, the bearing assembly 16 includes a rectangular flat plate 132 preferably having significant thickness, on the order of 0.5 inches to 0.075 inches (12.7 mm to 19.1 mm) which thus defines an edge surface 134. The rectangular flat plate 132 has a length and width preferably approximately equal to the separations between the pairs of bumpers 98, and 108 and 118 when the respective pairs of threaded shafts 94, 104, and 114 are in approximately their mid-positions in the pairs of brackets 92, 102, and 112 respectively. As illustrated in FIG. 1, the bumpers 98, 108, and 118 engage the edge surface 134 of the flat plate 132 and, by rotation of the adjustment assemblies 90, 100, and 110, facilitate radial repositioning of the bearing assembly 16 relative to the attachment assembly 14. The rectangular flat plate 132 includes a plurality of relatively large through apertures 136 which may receive a respective one of the studs 124 extending from the pair of rectangular plates 82. The through apertures 136 are large relative to the studs 124 such that motion and repositioning of the rectangular flat plate 132 on the surfaces 84 of the rectangular plates 82 may be readily accommodated. Pairs of conventional washers 138 and nuts 142 are utilized to secure the bearing assembly 16 to the adjustment assembly 14 after it has been adjusted to an appropriate radial position, as described below, by the adjustment assemblies 90, 100, and 110.

The bearing assembly 16 includes a pair of axially spaced-apart ball bearing assemblies 144 which are mounted within an elongate cylindrical housing 146. The cylindrical housing 146 may be secured by welding to the rectangular flat plate 132 and welded gussets 148 may be utilized to reinforce the assembly 16. The cylindrical housing 146 terminates in a square plate 152 having a face which is accurately parallel to the end face of the rectangular flat plate 132. The square plate 152 is preferably secured to the cylindrical housing 146 by welding and includes a plurality of through openings 154 which receive a like plurality of machine bolts 156 which attach the boring bar drive assembly 20 to the bearing assembly 16.

Figure 5:
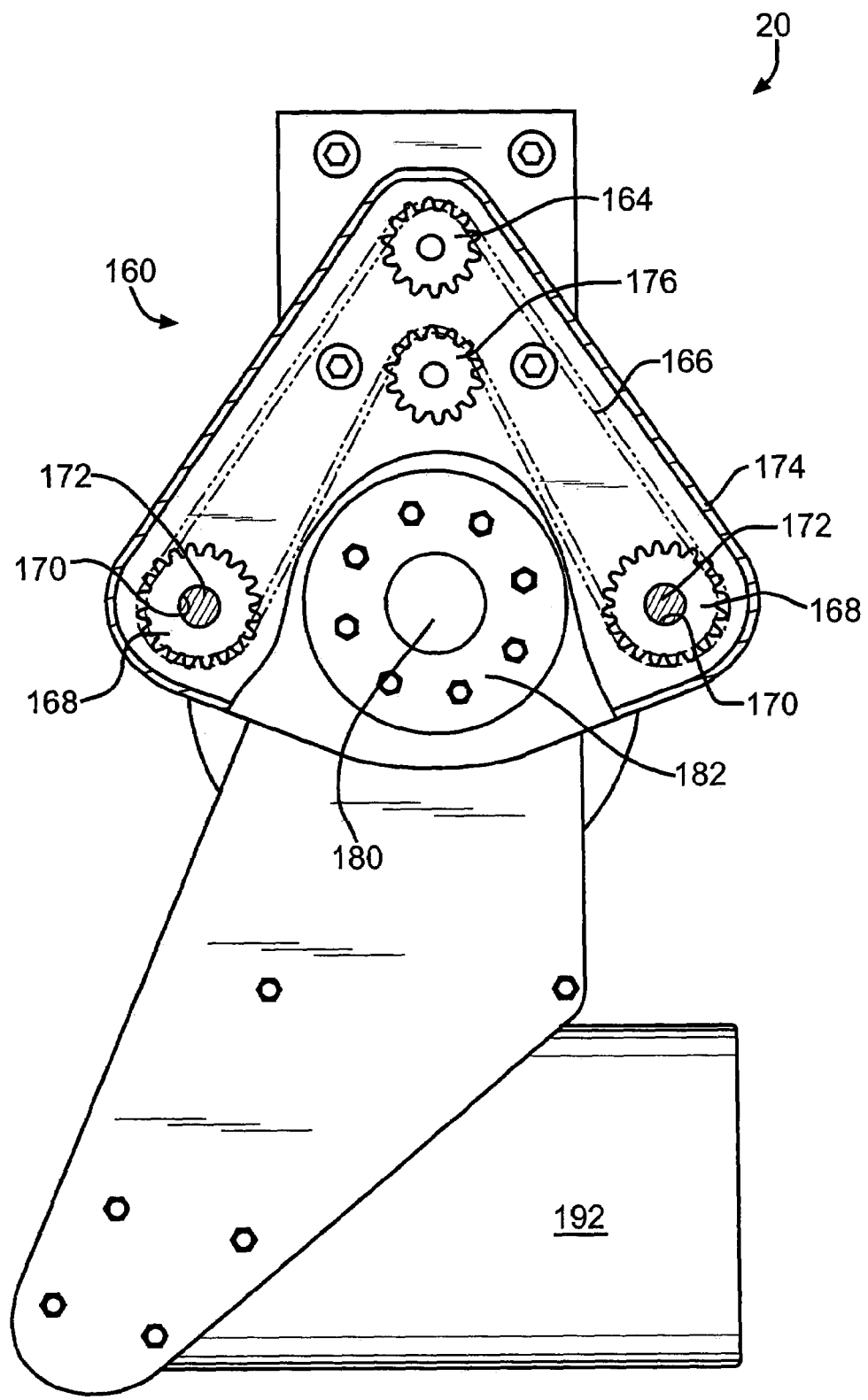
FIG. 5 is a plan view of the boring tool axial drive (feed) assembly of a boring apparatus according to the present invention.
Figure 6:
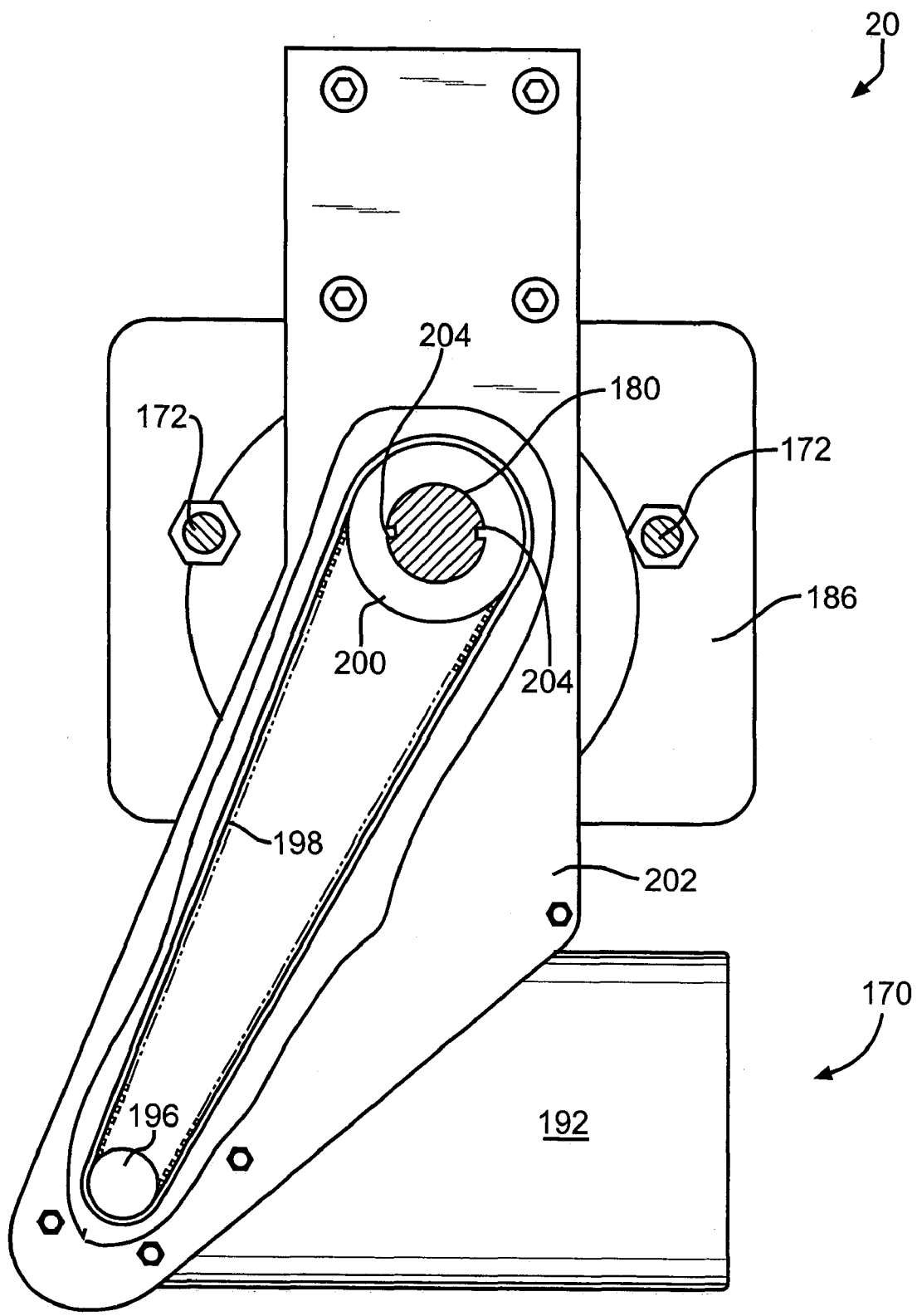
FIG. 6 is a plan view of the boring tool rotary drive (speed) assembly of a boring apparatus according to the present invention.

Referring now to FIGS. 1, 5 and 6, the boring bar drive assembly 20 includes a boring bar axial drive (feed) assembly 160. The axial drive assembly 160 includes a first reversible and variable speed electric motor 162 which drives a chain drive sprocket 164 and, in turn, a drive chain 166. The drive chain 166 is wrapped about and engages a pair of driven chain sprockets 168 having concentrically disposed internally threaded apertures 170. Each of the driven chain sprockets 168 receives a respective one of a pair of threaded shafts 172. The driven chain sprockets 168 are free to rotate but are held captive within a first housing 174 of the boring bar drive assembly 20. The drive chain 166 also circulates about an idler sprocket 176. The pair of threaded shafts 172 extend to and are fixedly secured by, for example, lock nuts 178 to a second housing 184. Thus as the drive chain 166 circulates and rotates the driven chain sprockets 168, the threaded shafts 172 translate axially relative to the housing 174 and translate the first housing 174 relative to the second housing 184.

A boring bar 180 which forms a portion of the boring bar assembly 18 extends into the first housing 174 and is received within an antifriction bearing such as a ball bearing assembly 182. The boring bar 180 is freely rotationally received within the housing 174 by virtue of antifriction bearing assembly 182 but it is also restrained against axial motion. Accordingly, when the electric motor 162 is energized, it rotates the driven chain sprockets 168 which translate the first housing 174 along the pair of threaded shafts 172. Since the end of the boring bar 180 is axially restrained within the housing 174 it, too, moves axially relative to the second housing 184.

Referring now to FIGS. 1 and 6, the boring bar drive assembly 20 also includes a boring bar rotating (speed) assembly 190. The boring bar rotating assembly 190 include a second electric motor 192 which drives, preferably through a right angle drive assembly 194, a toothed wheel or gear pinion 196. The gear pinion 196 engages a toothed belt such as a timing belt 198 or a chain which drives a complementarily toothed drive collar 200. The drive collar 200 is free to rotate but is axially restrained within a housing 202. The toothed drive collar 200 includes a pair of diametrically opposed axially extending drive keys 204. The drive keys 204 engage complementary, diametrically opposed, axially extending slots or channels 206 formed in the boring bar 180. When the electric drive motor 192 is energized, rotational energy is provided to the drive collar 200 which rotates the boring bar 180 and an associated boring or cutting tool 210 attached to the end of the boring bar 180 opposite the boring bar drive assembly 20.

The first electric drive motor 162 and the second electric drive motor 192 are controlled by a control box or unit 212. The control unit 212 includes a directional switch 214 which selects the direction of rotation of the first electric motor 162 associated with the feed of the boring bar 180 and a variable, preferably rotary control 216 which, in conjunction with a SCR or triac controller, adjusts the speed of the first electric motor 162. An on-off switch 218 controls energization of the second electric motor 192 which rotates the boring bar 180. Electrical energy is provided to the control unit 212 through a conventional cordset.

Referring now to FIGS. 1 and 7, a first repair configuration of a motor vehicle axle 220 is illustrated. The motor vehicle axle 220 includes a brake flange 222 having a plurality through apertures 224 which are offset from and parallel to the axis of the axle 220. The apertures 224 are utilized to receive a plurality, typically at least four, bolts 226 which extend through the openings 52 in the lugs or ears 42 of the assembly 12. Suitable nuts 228 are secured and tightened upon the bolts 226 to retain the lugs or ears 42 and all of the associated components of the boring apparatus 10 in place upon the axle 220. A portion of the axle 220 extending beyond (to the right as illustrated in FIG. 7) of the brake flange 222 has previously been damaged, which has occasioned the repair described herein. Such damage typically occurs near the terminal portion of the axle 220, away from the brake flange 222. The damaged portion (not illustrated) has therefore been cut off such that only solid and undamaged material remains between the location of the cut and the brake flange 222.

At this time the boring apparatus 10 is assembled without the boring bar drive assembly 20. Depending upon the original length of the axle 220 to the right of the brake flange 222, as illustrated in FIG. 7, as well as the length of the remaining (undamaged) axle 220, suitable length (or thickness) spacers 64 are selected which properly axially locate the boring apparatus 10 relative to the axle 220, the preferred location being the closest, i.e., shortest (or thinnest) spacers 64 that will locate the boring apparatus 10 closest to the axle 220 while permitting operation and inspection of the boring operation. Setup proceeds by utilizing the boring bar 180 with a dial indicator (not illustrated) disposed at its terminal portion rather than a boring or cutting tool such as the tool 210. The boring bar 180 and the dial indicator are inserted into the bearing assembly 16 and the thumb wheel adjustments 96, 106 and 118 are utilized in conjunction with one another to minimize runout of the dial indicator as it and the boring bar 180 are rotated within the cut off end of the axle 220, thereby positioning the bearing assembly 16 and specifically the center axis of the bearing assemblies 144 ad the boring bar 180 on, i.e., coincident with, the center axis of the axle 220. The boring bar 180 having the dial indicator is then removed and the boring bar 180 having a cutting tool 210 is installed in the bearing assembly 16. Next, the boring bar drive assembly 20 is secured to the bearing assembly 16 by installing and tightening the machine bolts 156. The boring apparatus 10 is thus assembled into the configuration illustrated in FIG. 1. The interior region of the axle 220 is then bored to receive a replacement spindle assembly 230 illustrated in FIG. 7 or the replacement spindle assembly 250 illustrated in FIG. 8.

The replacement spindle assembly 230 includes an elongate spindle 232 having a threaded terminal portion 234, an outer bearing surface 236 and an inner bearing surface 238. The spindle 232 is received within and secured to a sleeve 240 having an inside diameter just slightly larger than the outside diameter of the corresponding region of the spindle 232. The spindle 232 and sleeve 240 are preferably secured by weld material 242 fully about its circumference on the ends of the spindle 232 and the sleeve 240 opposite the threaded portion 234 of the spindle 232. As will be readily appreciated, the outside diameter of the sleeve 240 is just slightly less than the inside diameter of the axle 220 which has just been bored by the boring apparatus 10. The spindle assembly 230 is then installed in the bored portion of the axle 220. Upon insertion of the spindle assembly 230 into the axle 220, a full circumferential weld 244 is emplaced between the sleeve 240 and the axle 220. Additionally, acuate slots 246 are preferably cut in the wall of the axle 220 and weld material 248 is added therein to secure the rearward portion of the spindle assembly 230 to the axle 220.

Figure 8:
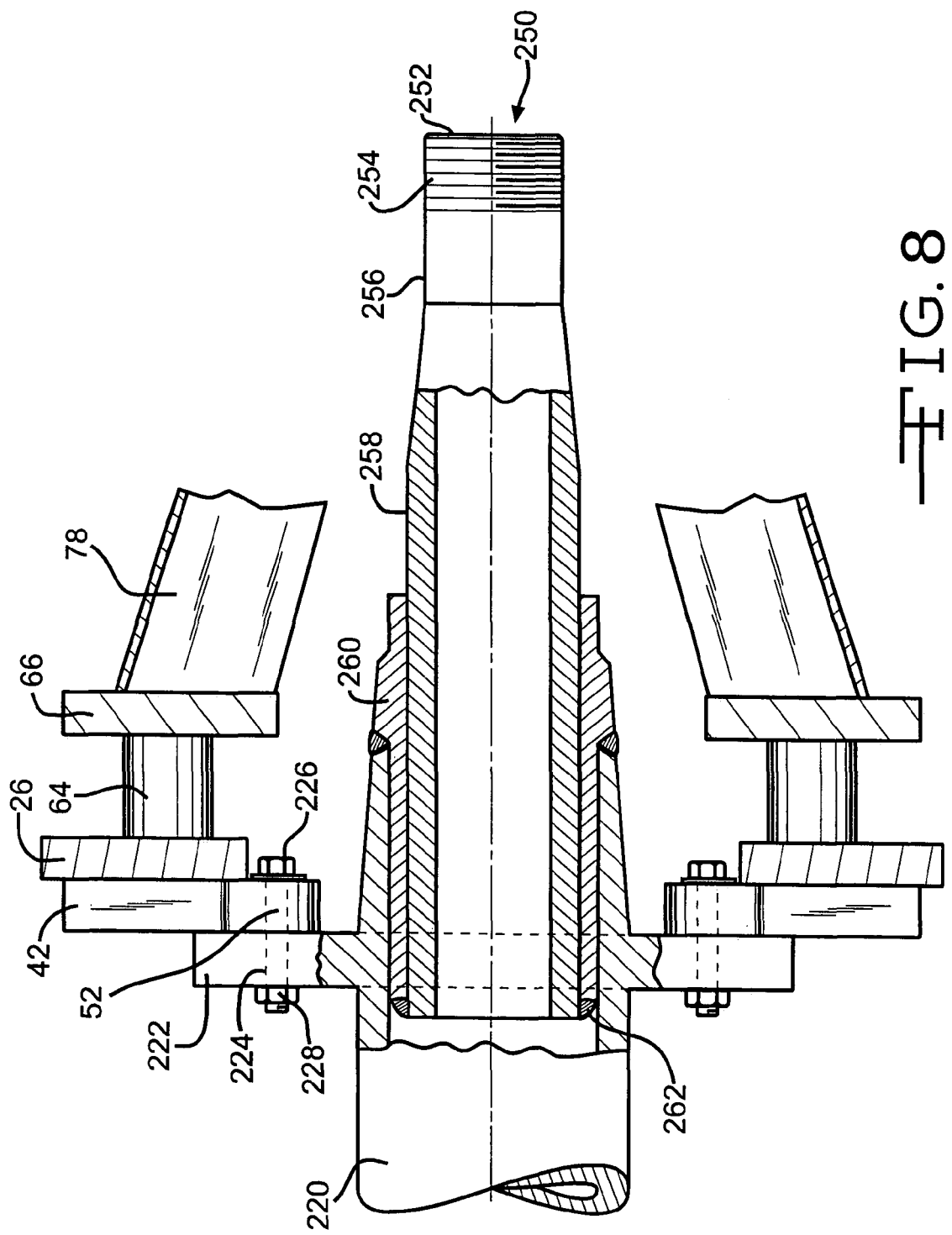
FIG. 8 is a diagrammatic view of a second method of axle repair according to the present invention.

Referring now to FIGS. 1 and 8, an alternate replacement spindle assembly 250 is illustrated. It should be appreciated that although the spindle assembly 250 is different from the spindle assembly 230 discussed above with regard to FIG. 7, the installation, i.e., mounting of the boring apparatus 10 onto the axle 220, and operation thereof is the same. That is, the ears or lugs 42 are secured to the brake flange 222 of the axle 220 by machines bolts 226 that extend through the openings 52 in the lugs or ears 42 and openings 224 in the brake flange 222 to be secured by nuts 228. The boring bar 180, temporarily having a dial indicator secured thereto in place of a cutting or boring tool 210 is inserted into the bearing assembly 16 and the thumb wheels 96, 106 and 116 are adjusted in conjunction with one another to center the bearing assembly 16 on the center axis of the axle 220. The boring bar 18 is then installed with a cutting tool 210 and the drive assembly 20 is activated to bore out the interior of the axle 220 to a desired inside diameter.

The spindle assembly 250 includes a spindle 252 having a threaded terminal portion 254, an outer bearing surface 256 and an inner bearing surface 258. The largest outside diameter of the spindle 252 which typically corresponds to the diameter of the inner bearing surface 252 is just slightly smaller than the inside diameter of a sleeve 260. A sleeve 260 is a slightly different configuration than the sleeve 230 discussed above and includes a shaped exterior surface. Once again, however, the sleeve 260 is secured to the spindle 252 by a circumferential weld 262 at the end of the sleeve 252 opposite the threaded terminal portion 254. The inside diameter of the axle 220 is bored out to a diameter just slightly larger than the outside diameter of the sleeve 260. The spindle assembly 250 is then inserted into the bored out portion of the axle 220 and a full circumferential weld 264 secures the spindle assembly 252 to the axle 220.

The foregoing disclosure is the best mode devised by the inventor for practicing this invention. It is apparent, however, that apparatus and methods incorporating modifications and variations will be obvious to one skilled in the art of boring machines. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. An apparatus for boring vehicle axles comprising, in combination,
    a plate having an aperture adapted to receive a portion of a vehicle axle, a plurality of lugs adjustably secured to said plate and adapted for attachment to a feature of such vehicle axle;
    an adjustment assembly having a first end face disposed adjacent said plate, a second end, and a plurality of opposed pairs of adjustment devices adjacent said second end having axes normal to one another;
    spacer means disposed between said plate and said end of said adjustment assembly,
    a bearing assembly having a first end and a second end, said first end of said bearing assembly operably disposed adjacent said plurality of opposed pairs of adjustment assemblies, said bearing assembly including at least one bearing for stabilizing a boring bar, and
    a boring bar drive assembly secured to said second end of said bearing assembly and adapted to advance, retract and rotate a boring bar.

2. The apparatus of claim 1 wherein said adjustment devices includes aligned pairs of threaded members adapted for rotation.

3. The apparatus of claim 2 wherein said boring bar drive assembly includes a first motor adapted to advance and retract said boring bar and a second motor adapted to rotate said boring bar.

4. The apparatus of claim 1 wherein said spacer means includes a plurality of tubular spacers.

5. The apparatus of claim 1 further including an elongate boring bar having at least one elongate channel.

6. The apparatus of claim 1 further including a boring bar having a cutting tool.

7. The apparatus of claim 1 further including a controller for controlling the speed and direction of rotation of said first drive motor.

8. An apparatus for boring vehicle axles comprising, in combination,
    a plate having an aperture adapted to receive a portion of a vehicle axle defining an axis, a plurality of adjustable lugs secured to said plate and adapted for attachment to a feature of such vehicle axle;
    a radial adjustment assembly having a plurality of opposed pairs of adjustment devices having axes of motion normal to said axis of said vehicle axle, said adjustment assembly having a first end disposed adjacent said plate and a second end;
    an axial adjustment assembly disposed between said plate and said first end of said radial adjustment assembly,
    a bearing assembly having a first end and a second end, said first end of said bearing assembly positioned operably adjacent said plurality of opposed pairs of adjustment devices,
    said bearing assembly including at least one bearing for stabilizing a boring bar,
    a boring bar supported in said bearing assembly and adapted to bore such vehicle axle; and
    a drive assembly associated with said boring bar and having a first drive motor for advancing said boring bar and a second drive motor for rotating said boring bar.

9. The apparatus of claim 8 wherein said feature is a brake flange.

10. The apparatus of claim 8 wherein said axial adjustment assembly includes at least one spacer disposed between said plate and said first end of said radial adjustment assembly.

11. The apparatus of claim 8 wherein said axial adjustment assembly includes a plurality of spacers.

12. The apparatus of claim 8 wherein said radial adjustment assembly includes aligned pairs of threaded members.

13. The apparatus of claim 8 further including a boring bar having a cutting tool.

14. The apparatus of claim 8 further including a controller for controlling the speed and direction of rotation of said first drive motor.

15. An apparatus for repairing vehicle axles comprising, in combination,
- a plate having an aperture adapted to receive a portion of a vehicle axle, a plurality of mounting ears adjustably secured to said plate and adapted for securement to a feature of such vehicle axle;
- a radial adjustment assembly having at least two pairs of opposed adjustment devices having axes of motion normal to one another, said adjustment assembly having a first end disposed adjacent said first plate and a second end;
- axial adjustment means disposed between said plate and said first end of said radial adjustment assembly for fixing axial separation between said plate and said first end of said radial adjustment assembly,
- a bearing assembly having a first end and a second end, said first end of said bearing assembly disposed operably adjacent said opposed pairs of adjustment devices, said bearing assembly including at least one bearing for stabilizing a boring bar,
- a boring bar supported in said bearing assembly and having a cutting tool adapted to bore such vehicle axle; and
- a drive assembly associated with said boring bar and having a first drive motor for advancing said boring bar and a second drive motor for rotating said boring bar.

16. The apparatus of claim 15 wherein said drive assembly is secured to said second end of said bearing assembly.

17. The apparatus of claim 15 wherein said axial adjustment means is a plurality of cylindrical spacers.

18. The apparatus of claim 15 wherein said boring bar includes at least one axial groove disposed therealong.

19. The apparatus of claim 15 wherein said pairs of adjustment devices include threaded shafts and thumb wheels.

20. The apparatus of claim 15 further including a controller for controlling speed and direction of rotation of said first drive motor.

* * * * *

UNITED STATES PATENT AND TRADEMARK OFFICE
CERTIFICATE OF CORRECTION

PATENT NO. : 7,066,690 B2
APPLICATION NO. : 10/624184
DATED : June 27, 2006
INVENTOR(S) : James L. Ebert It is certified that error appears in the above-identified patent and that said Letters Patent is hereby corrected as shown below:

On the Title Page

Column 1, item (75), delete "Freemont" and substitute --Huron-- in its place.

Signed and Sealed this

Twenty-sixth Day of December, 2006

JON W. DUDAS
*Director of the United States Patent and Trademark Office*